Patented Dec. 6, 1949

2,490,099

UNITED STATES PATENT OFFICE 2,490,099

FLUOROCYCLOHEXYL AMINE COMPOUNDS

Joseph H. Simons, State College, Pa., assignor to Minnesota Mining & Manufacturing Company, St. Paul, Minn., a corporation of Delaware No Drawing. Application July 14, 1948, Serial No. 38,752

2 Claims. (Cl. 260—563)

This application relates to the discovery of a new and useful class of synthetic cyclic carbon compounds which contain only nitrogen and fluorine in addition to carbon.

More specifically, this application relates to the discovery of tridecafluorocyclohexyl amine, $C_6F_{11}NF_2$, a cyclic compound having a 6-carbon ring and a single nitrogen atom which is bonded to one carbon atom of the ring and to two fluorine atoms. The structural formula is:

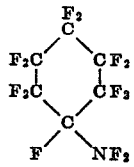

This compound is liquid at room temperature and has a boiling point of about 77° C.

This compound corresponds to cyclohexyl amine, $C_6H_{11}NH_2$, the hydrogen atoms thereof being entirely replaced by fluorine atoms. The present compound has a much lower boiling point, since the boiling point of cyclohexyl amine is 134° C.; despite the fact that its molecular weight is 333, whereas that of cyclohexyl amine is 99. Cyclohexyl amine is a primary amine and may be regarded as derived from ammonia, $NH_3$, by replacement of one hydrogen atom by a hydrocarbon radical. The present compound should be regarded as derived from $NF_3$, by replacement of one fluorine atom by a fluorocarbon radical, and cannot properly be classed as an "amine," despite the name given to it as a matter of expediency in accordance with recognized nomenclature practice.

The present invention also includes higher-boiling homologous compounds wherein a saturated fluorocarbon side group or chain, having the formula —$C_nF_{2n+1}$, is bonded to a carbon atom of the ring, replacing a fluorine atom. These correspond to the C-alkyl cyclohexyl amine compounds, the hydrogen atoms being replaced by fluorine atoms. Examples of such homologous compounds are: $CF_3C_6F_{10}NF_2$, pentadecafluoromethylcyclohexyl amine, corresponding to methylcyclohexyl amine; $C_2F_5C_6F_{10}NF_2$, heptadecafluoroethylcyclohexyl amine, corresponding to ethylcyclohexyl amine; $C_3F_7C_6F_{10}NF_2$, nonadecafluoropropylcyclohexyl amine, corresponding to propylcyclohexyl amine; $C_4F_9C_6F_{10}NF_2$, heneicosafluorobutylcyclohexyl amine, corresponding to butylcyclohexyl amine; $C_5F_{11}C_6F_{10}NF_2$, tricosafluoroamylcyclohexyl amine, corresponding to amylcyclohexyl amine; $C_6F_{13}C_6F_{10}NF_2$, pentacosafluorohexylcyclohexyl amine, corresponding to hexylcyclohexyl amine.

The members of this homologous series (including the first member) may be represented by the generic formula:

$$C_nF_{2n+1}C_6F_{10}NF_2$$

where $n$ is zero or an integer.

The compounds of this invention have physical properties resembling those of the saturated fluorocarbons (carbon fluorides). They have a high degree of thermal stability, exceptionally low boiling points relative to molecular weight, low refractive indices, low dielectric constants, low viscosities and low surface tensions. They may be employed as solvents, hydraulic mechanism fluids and dielectrics. Unlike the fluorocarbons (wherein the fluorine atoms are all bonded to carbon atoms), the present compounds contain two nitrogen-bonded fluorine atoms in the molecule in consequence of which the molecule is reactive. They are able to enter into various chemical reactions so as to have value as chemical intermediates in the production of other compounds, the —$NF_2$ group and either or both of the N-bonded fluorine atoms being replaceable by other atoms and radicals.

The electrochemical process broadly described and claimed in my copending application, Ser. No. 677,407, filed June 17, 1946, (since abandoned in favor of Ser. No. 62,496, filed November 29, 1948), may be employed in preparing compounds of this invention. Briefly, this process involves electrolyzing in liquid hydrogen fluoride a corresponding hydrogen-containing starting compound, having the same or a similar skeleton structure as that of the desired product compound. Thus cyclohexyl amine, $C_6H_{11}NH_2$, can be used as the starting compound for making tridecafluorocyclohexyl amine, $C_6F_{11}NF_2$. Also, it is possible to use the corresponding aromatic hydrogen-containing compound as the starting compound, in which case the process causes fluorine addition as well as hydrogen replacement to produce the saturated product compound. Thus aniline, $C_6H_5NH_2$, can also be used as the starting compound for making $C_6F_{11}NF_2$, as illustrated in the subsequent example.

The electrochemical process also produces a saturated cyclic fluorocarbon compound having the same number of carbon atoms as the starting compound, resulting from breaking of the N-C bond. Thus dodecafluorocyclohexane, $C_6F_{12}$, as well as $C_6F_{11}NF_2$ is produced by electrolyzing cyclohexyl amine or aniline. There are also produced various fluorocarbon fragmentation products containing fewer carbon atoms than the starting compound. $NF_3$ is formed. Separation can be effected by fractional distillation.

A simple type of electrolytic cell can be used, employing a nickel anode and an iron or steel cathode, for example. An iron or steel container can be used, which may be employed as a cathode, with a cover of iron or steel which is bolted in place. Anode and cathode plates, in alternating array, can be suspended from the cover. A suitable gasket material, and insulating material for electrode mountings and leads, is "Teflon" (polytetrafluoroethylene). An upper outlet for gaseous products, an upper inlet for charging materials, and a bottom outlet for liquid products, may be provided. The cell may be provided with a cooling jacket for maintaining a desired operating temperature.

Commercial anhydrous liquid hydrogen fluoride can be used. This normally contains a trace of water, but water need not be present and highly anhydrous hydrogen fluoride can be used. The starting compounds are soluble in the liquid hydrogen fluoride and provide adequate electrolytic conductivity.

A cell potential of about 4 to 8 volts has been found suitable. A current density of 20 or more amperes per square foot of anode surface can readily be obtained. Voltages sufficiently high to result in the formation of free fluorine are avoided. The process does not depend upon the generation of free fluoride and the latter, if produced, would result in explosions, electrode corrosion, and undesirable reactions.

A preferred operating pressure is atmospheric pressure and a preferred operating temperature is about 0° C., but higher and lower operating pressures and temperatures can be employed.

The constituent compounds of the gaseous and liquid product mixtures can be separated by fractional distillation.

Example

This example illustrates the making of $C_6F_{11}NF_2$, tridecafluorocyclohexyl amine, using aniline as the starting compound and employing the previously described electrochemical process.

Use was made of a small iron laboratory cell having a nickel anode, operating at atmospheric pressure and a temperature of 0° C. The cell was initially charged with about 650 grams of anhydrous liquid hydrogen fluoride and about 30 grams of anhydrous aniline. During the run additional aniline was added to maintain the current flow, the total being about 90 grams. The average cell voltage was 5.5 volts D. C. The run duration was about 200 hours and a total of 14 faradays of current was passed. The mixture of gaseous products evolved from the cell was led through a train consisting of a tube packed with sodium fluoride, a sodium hydroxide bubbler, a sulfuric acid bubbler (drier), and a trap cooled by solid $-CO_2$. The condensate from the latter was subjected to fractional distillation and there was obtained a liquid fraction which was identified as relatively pure $C_6F_{11}NF_2$, tridecafluorocyclohexyl amine, having the following measured properties:

Boiling point _____°C__ 77
Refractive index (at 20° C.) _____ 1.292
Molecular weight (from vapor density) __ 334
Per cent F _____ 74.4

The values calculated from the formula of the pure compound are: molecular weight, 333; per cent F, 74.2.

There was also obtained a fraction identified as the cyclic fluorocarbon $C_6F_{12}$, dodecafluorocyclohexane, having a boiling point of about 50° C. This product resulted from the breaking of the carbon-nitrogen bond in a portion of the material.

What I claim is as follows:

1. The new and useful cyclic compound tridecafluorocyclohexyl amine, $C_6F_{11}NF_2$, a liquid compound having a boiling point of about 77° C.

2. The new and useful cyclic compounds of the class consisting of tridecafluorocyclohexyl amine and of fluoroalkylcyclohexyl amines which have the formula:

$$C_nF_{2n+1}C_6F_{10}NF_2$$

where $n$ is in integer.

JOSEPH H. SIMONS.

REFERENCES CITED

The following references are of record in the file of this patent:

Reprint, "Fluorine Chemistry" (Ind. Eng. Chem., March 1947), pp. 359–434.